Inventor
Paul H. Harrer
Attorney

Oct. 17, 1961 P. H. HARRER 3,004,377
BALING MACHINE
Filed Feb. 25, 1958 6 Sheets-Sheet 6

Inventor
Paul H. Harrer
By W. Gierald
Attorney

United States Patent Office 3,004,377
Patented Oct. 17, 1961

3,004,377
BALING MACHINE
Paul H. Harrer, La Porte, Ind., assignor to Allis-Chalmers Manufacturing Company, Milwaukee, Wis.
Filed Feb. 25, 1958, Ser. No. 717,503
16 Claims. (Cl. 56—341)

The invention relates to baling machines and it is concerned more particularly with a baling machine in which a supply mechanism is operable to gather material continuously and to feed it intermittently to the bale forming mechanism of the machine.

Hay baling machines for use on farms are usually equipped with a pickup and conveying mechanism which gathers windrowed hay and feeds it rearwardly as the machine is advanced in the field, and with a processing mechanism which is supplied by the conveying mechanism. The processing mechanism forms the picked up hay into a compacted bale and wraps it with twine or other binding material before the finished bale is ejected from the machine.

In some baling machines of conventional construction, as for instance in the rotary type of machine which rolls a mat of material into a round bale, the bale forming and wrapping operations are performed consecutively. That is, the machine is cycled to first perform a material compacting operation, then a bale wrapping operation and finally a bale ejecting operation. Depending on the length of time which is required to perform the bale wrapping and ejecting operations, a more or less extended time interval occurs between the moment when the machine has finished compacting the material for one bale and before it starts compacting material for the next bale. This time interval during which no material is being compacted by the machine presents a problem because the feed of material into the processing mechanism must be stopped for the length of said interval.

The usual practice of stopping the feed of material into the bale forming mechanism of rotary balers during the bale wrapping and ejecting phases of the operating cycle is to stop advance movement of the machine in the field for the length of time which is required to perform the bale wrapping and ejecting operations, and during that length of time to also stop the operation of the pickup and conveying mechanism.

Attempts have been made during the past to eliminate the necessity of such periodic stops of the machine in the field. In that connection it has been suggested, for instance, to provide a rotary baler which performs the bale rolling operation in one part and the bale wrapping operation in another part of the processing mechanism. When the bale rolling mechanism of such a machine has formed a bale of the desired diameter, the bale is transferred quickly from the bale rolling mechanism to a separate bale wrapping mechanism which is arranged on the machine in the rear of the bale rolling mechanism. The time interval during which the feed of material to the processing mechanism of such a machine must be stopped is determined by the length of time which is required to transfer the bale from the bale rolling to the bale wrapping mechanism of the machine. Since this time can be kept very short it was proposed to advance the machine continuously in the field and to also operate the pickup and conveying mechanism continuously, but to periodically block the passage of material into the processing mechanism just long enough to permit transfer of a rolled bale into the wrapping mechanism.

For satisfactory operation of a hay baling machine it is desirable that the pickup and conveying mechanism is capable of handling a substantial volume of material at a reasonable ground speed of the machine. Under these conditions temporary blocking of the material so that it will pile up on the conveyer for even a very brief period of time has been found to be impractical because it is apt to plug the machine. Also the provision of separate bale rolling and wrapping mechanism as heretofore proposed entails relatively high additional manufacturing costs.

Generally it is an object of the present invention to provide an improved baling machine for loose material such as hay, which is operable to gather the material continuously and to feed it intermittently to a processing mechanism without causing plugging of the machine under relatively heavy feeding conditions.

More specifically, it is an object of the invention to provide an improved material supply mechanism for baling machines and the like which is continuously operable to gather material and selectively adjustable to either a material emitting or a material accumulating condition, adjustment of the supply mechanism to its material emitting condition enabling it to feed a processing mechanism during a material admitting phase of the latter, and adjustment of the supply mechanism to its material accumulating condition enabling it to prevent passage of material to the processing mechanism during a material shut off phase of the latter.

A further object of the invention is to provide an improved material supply mechanism of the hereinbefore outlined character which is operable, in its material accumulating condition, to circulate gathered material in an endless path and thereby form an extended mat of progressively increasing thickness on one stretch of said path, and which mechanism in its material emitting condition will convey the gathered material and said mat to a desired point of delivery, such as the inlet to the processing mechanism of a baling machine.

A still further object of the invention is to provide an improved continuously operable rotary baler, that is, a rotary baler which may be operated in the field to pick up a windrow and to successively eject twine wrapped round bales, without need to either interrupt the advance movement of the machine or the operation of a pickup mechanism during the bale wrapping and ejecting phases of each operating cycle.

A still further object of the invention is to provide an improved continuously operable rotary baler in which the bale rolling operation is followed by bale wrapping and bale ejecting operations before a new bale rolling operation is started, and in which the feed of material to the bale rolling mechanism is interrupted for the duration of the bale wrapping and ejecting operations.

A still further object of the invention is to provide a continuously operable rotary baler incorporating an improved material supply mechanism of the hereinabove outlined character and a control mechanism for automatically coordinating the material accumulating and emitting operations of the supply mechanism with the bale forming, wrapping and ejecting operations of the processing mechanism of the baler.

More specifically, it is an object of the invention to provide an improved rotary baler of the hereinabove outlined character in which the mentioned control mechanism is relatively simple and readily lends itself for connection with a cycling mechanism which controls the bale forming, wrapping and ejecting phases of the processing mechanism.

A still further object of the invention is to provide an improved continuously operable rotary baler of the hereinbefore outlined character which is of relatively simple overall construction, efficient and reliable in operation, and which may be manufactured at a relatively low cost.

These and other objects and advantages are attained by the present invention, various novel features of which will be apparent from the description herein and the accompanying drawings disclosing an embodiment of the invention, and will be more particularly pointed out in the appended claims.

Referring to the drawings and using the terms right and left as applied when looking forwardly from behind the machine.

The principal component parts of the pick-up baler shown in the drawings are a material supply mechanism generally designated by the reference character 1, and a processing mechanism generally designated by the reference character 2. The processing mechanism is of the rotary baler type and conforms in some respects with well known principles of construction and operation. Briefly reviewing the processing mechanism 2, it will be seen that a main frame 3 is supported on right and left ground wheels 4 and 6 (FIG. 2) and has a forwardly extending draft structure 7. A suitable hitch device (not shown) is mounted on the forward end of the draft structure 7 for connection with the drawbar of a tractor in conventional manner.

Power for operating the processing mechanism 2 is derived from a tractor power take-off shaft (not shown) and transmitted to a gear mechanism 8 (FIGS. 2 and 3) by means of a line shaft 9. The gear mechanism 8 has a power input shaft 11 and is suitably connected through another gear mechanism 12 (FIG. 3) with a lower drive roll 13 and an upper drive roll (FIGS. 1 and 4) of a bale forming mechanism. The bale forming mechanism is of generally conventional construction and comprises a lower set of bale forming belts 16 and an upper set of bale forming belts 17. The lower belts 16 are trained about the lower drive roll 13, a lower tension roll 18 and a lower trip roll 19. The lower tension roll 18 is rotatably mounted for up and down swinging movement about a pivot center 21 by means of a lower tension arm 22 at the left side of the machine, and a corresponding tension arm 23 (FIG. 3) at the right side of the machine. The upper bale forming belts 17 are trained about the upper drive roll 14, an upper tension roll 24 and an upper trip roll 26. The upper tension roll 24 is rotatably mounted for up and down swinging movement about a pivot center 27 by means of an upper tension arm 28 at the left side of the machine and by a corresponding upper tension arm 29 (FIG. 3) at the right side of the machine.

A connecting rod 31 at the left side of the machine has a lower end connected to the lower tension arm 22 and is operatively connected at its upper end with the upper tension arm 28, and a similar connecting rod 32 at the right side of the machine is pivotally connected at its lower end with the lower tension arm 23 and at its upper end with the upper tension arm 29. A strong tension spring 33 (FIG. 3) is anchored at its lower end on the main frame 3 and is operatively connected at its upper end with the upper tension arms 28 and 29 so as to bias the latter in anticlockwise direction as viewed in FIG. 3, and in clockwise direction as viewed in FIG. 1 about the pivot center 27. The connecting rods 31 and 32 transmit pivotal movement of the upper tension arms 28 and 29 to the lower section arms 22 and 23 so that the upper and lower tension arms will move in unison about their respective pivot centers 27 and 21 during the bale forming and bale ejecting operations of the machine.

A toggle linkage 34 of conventional construction as shown for instance in U.S. Patent 2,336,491, issued December 14, 1943 to U. F. Luebben for Rotary Baler, is operatively connected with the trip rolls 19 and 26 and with the lower end of a bow member 36 at the left side of the machine. A similar toggle linkage 37 (FIG. 3) at the right side of the machine is operatively connected with the lower and upper trip rolls 19 and 26 and with a bow member 38. The bow members 36 and 38 are pivotally suspended at their upper ends on arms 39 and 41, respectively, which are swingable about the pivot center 27 and are biased in clockwise direction, as viewed in FIG. 1, and in anticlockwise direction as viewed in FIG. 3, by a tension spring 42 at the left side of the machine and another tension spring 45 at the right side of the machine.

Figure 1:
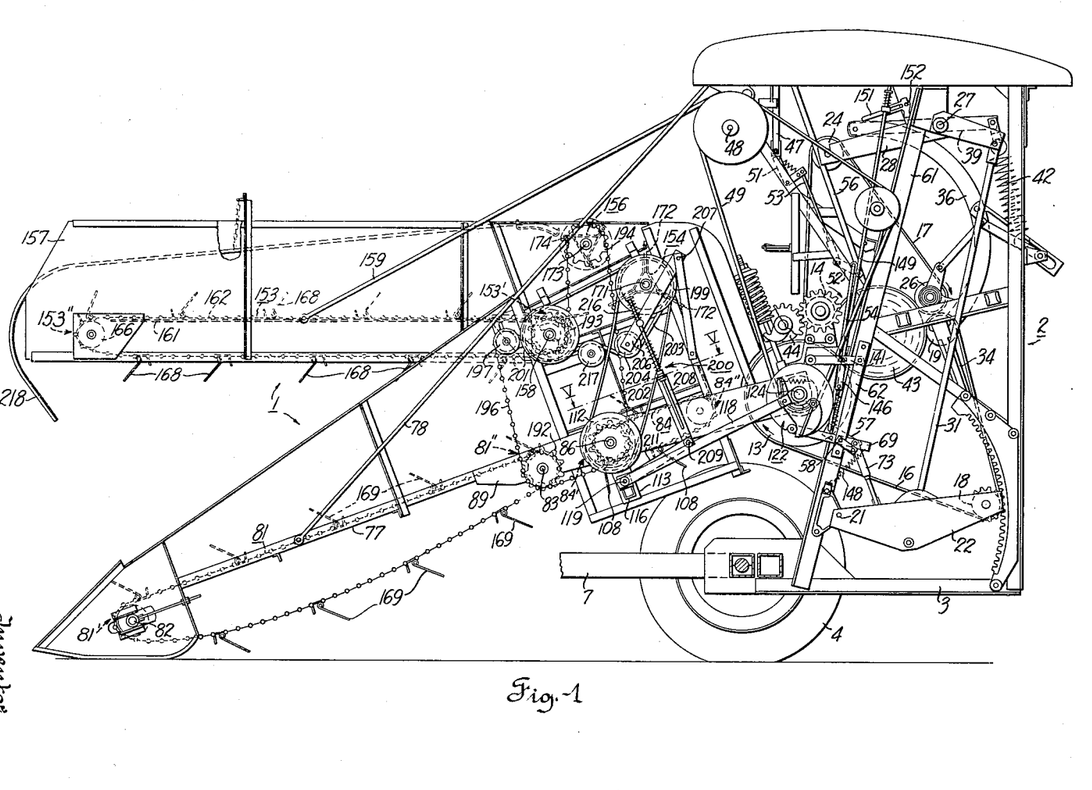
FIG. 1 is a left side view of a continuously operable rotary baler, portions of the machine being broken away and a left ground wheel being omitted and its supporting axle shown in section.
Figure 3:
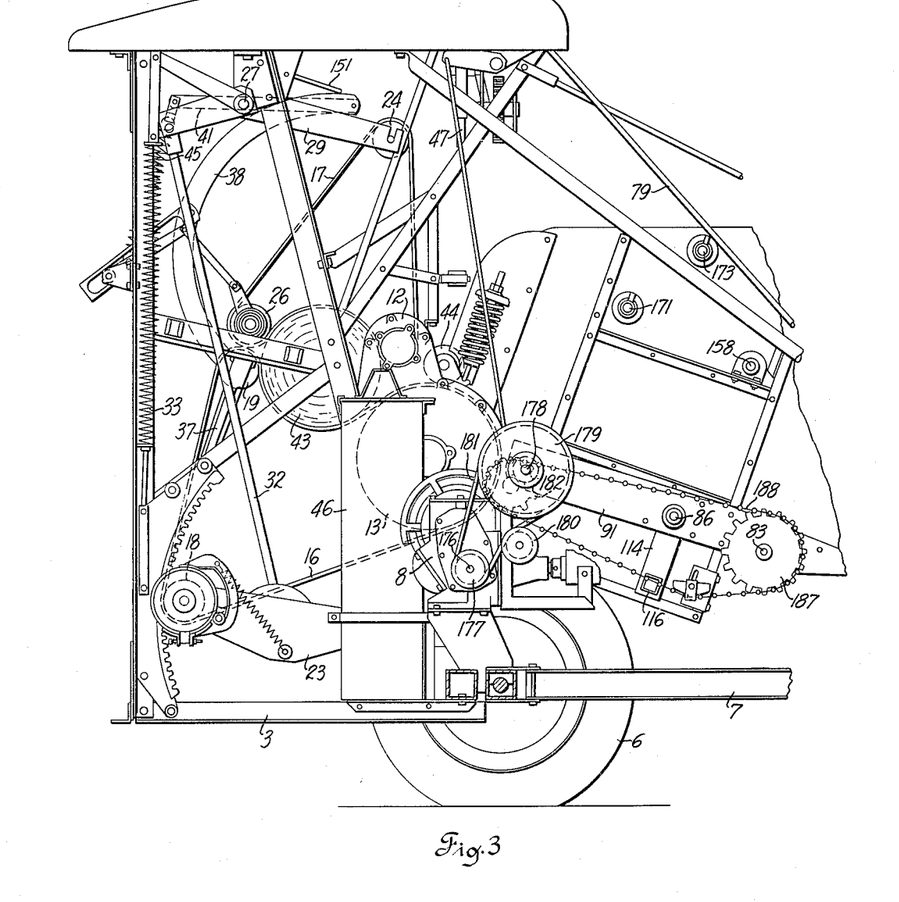
FIG. 3 is an enlarged right side view of part of the machine shown in FIGS. 1 and 2, a right ground wheel being omitted in FIG. 3 and its supporting axle shown in section.

Each of the toggle linkages 34 and 37 includes a latch mechanism (not shown) which retains the trip rolls 19 and 26 in proximity to each other as shown in FIGS. 1 and 3 during the bale rolling operation of the machine. When a bale of desired diameter has been formed, the latch mechanism for the trip rolls is disengaged by a suitable control linkage so that the trip rolls 19 and 26 may move apart and permit the formed bale to be ejected from the machine by the contracting force of the tension spring 33.

In the condition of the machine as shown in FIG. 1, a round bale 43 of less than the final diameter has been formed in the bale rolling chamber by the lower and upper belts 16 and 17. A spring loaded press roll 44 is mounted above the lower drive roll 13 and forwardly of the upper drive roll 14 to which it is connected by a pair of meshing spur gears as indicated in FIG. 1. Material which enters between the press roll 44 and the lower set of belts 16 is advanced in the form of a mat toward the rear through a gap between the lower drive roll 13 and the upper drive roll 14. These rolls are continuously driven in the direction of the arrows shown in FIG. 1, and as long as the feed of material into the bale rolling chamber continues, the bale grows steadily in diameter. As a result of such bale growth, the lower tension arms 22 and 23 are moved steadily upward about the pivot center 21, and the upper tension arms 28 and 29 are steadily moved downward about the pivot center 27 during the bale rolling operation of the machine. When the bale 43 has reached the desired final diameter the feed of material into the bale rolling chamber is automatically stopped as will be explained more fully hereinbelow.

A conventional twine dispensing mechanism becomes automatically effective after the feed of material into the bale rolling chamber has been stopped so as to wrap the bale of final diameter with twine. This mechanism is mounted at the upper forward part of the main frame 3 and, briefly, functions as follows. Twine (not shown) from a can 46 at the right side of the machine is passed through a twine guide tube 47 which is suitably mounted at one end for pivotal movement so that its other end can be swept lengthwise of the formed bale and the twine will be wrapped spirally about the bale during such lengthwise sweep of the twine tube 47. The details of the twine dispensing mechanism, its control and mode of operation are more fully described in U.S. Patent 2,468,641, issued April 26, 1949, to C. J. Scranton et al. for Rotary Baler.

Also in conformity with established practice and as disclosed in the mentioned Scranton et al. patent, the machine as shown in the accompanying drawings is equipped with a cycling mechanism for automatically controlling the bale forming, the twine wrapping and the bale ejecting phases of the operating cycle of the machine. Said cycling mechanism includes a drive shaft 48 (FIG. 1) which is continuously driven from the lower drive roll 13 by means of a belt 49; a control linkage for the twine tube 47; and a control linkage for the latch mechanism of the trip roll toggles 34 and 37.

The control linkage for the twine tube 47 is shown in FIG. 1 and comprises a spring biased bell crank lever 51; a second bell crank lever 52; a connecting link 53 between the bell crank levers 51 and 52; and an up and down movable actuating rod 54 for the bell crank lever 52.

The actuating linkage for the latch mechanism of the trip roll toggles 34 and 37 includes an up and down shiftable link 56 which is automatically pulled upward at the end of the twine wrapping operation in order to initiate the bale ejecting operation by release of the latch mechanism for the trip roll toggles 34 and 37.

Figure 4:
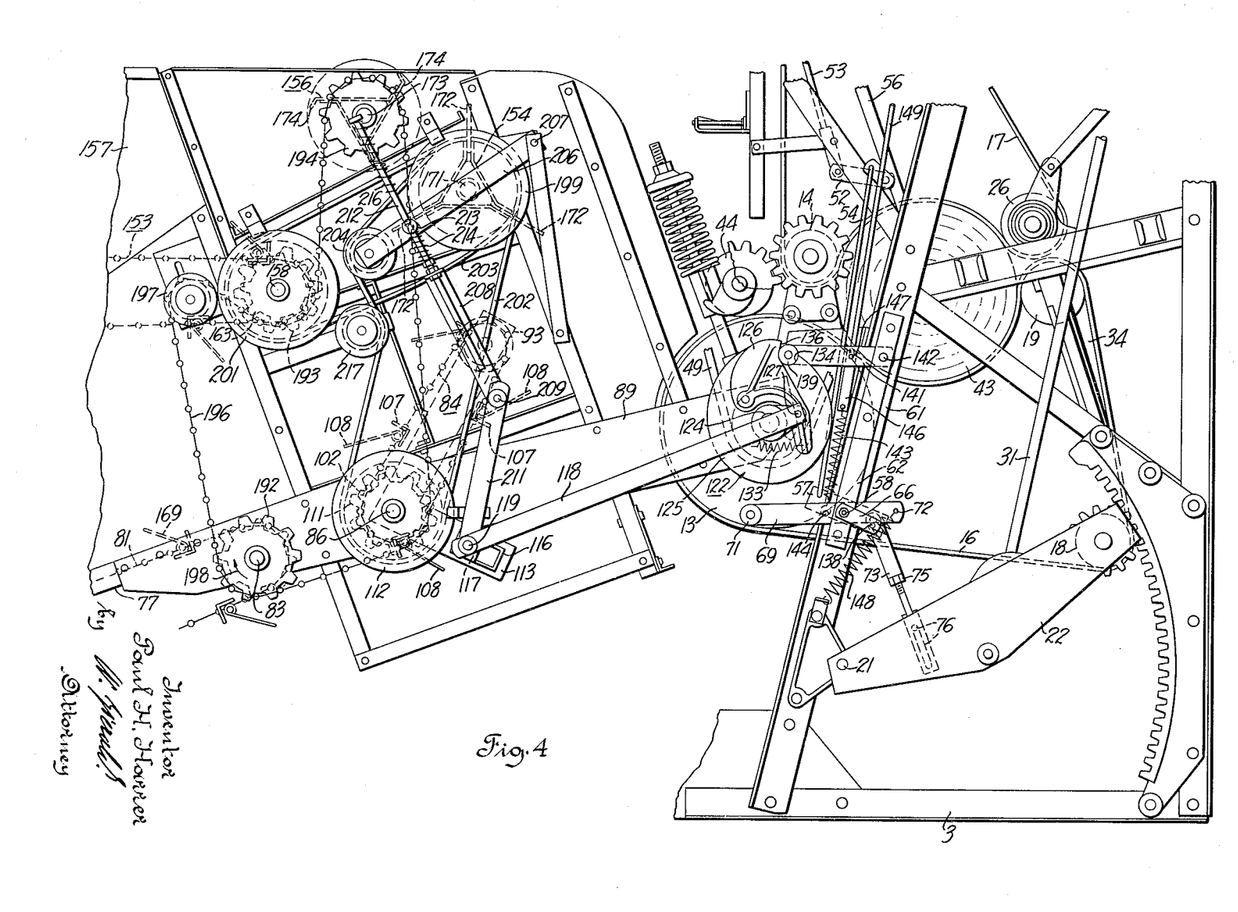
FIG. 4 is an enlarged left side view of part of the machine shown in FIG. 1, a material transfer mechanism shown in FIG. 1 being shown differently adjusted in FIG. 4.
Figure 10:
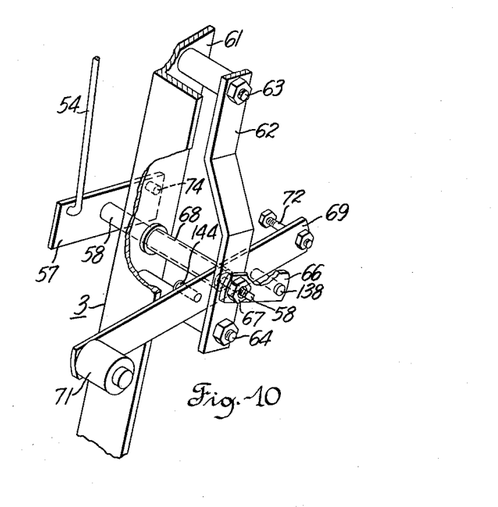
FIG. 10 is a perspective view of parts of a control mechanism shown in FIGS. 1 and 4.

Referring to FIGS. 4 and 10, it will be seen that a rock shaft 58 is rotatably supported in a generally upright angle brace 61 of the main frame and in a bracket strap 62 which is secured to the angle brace 61 by bolts 63 and spacers 64. Rigidly secured to the inner or right end of the rock shaft 58 is a trip arm 57 which extends radially from the shaft 58 in opposite directions. The forwardly extending portion of the trip arm 57 is pivotally connected with the lower end of the actuating rod 54. The rearwardly extending portion of the trip arm 57 has an actuating connection with the lower tension arm 22, as shown in FIG. 1, which will be described more fully hereinbelow.

The outer or left end of the rock shaft 58 mounts a clutch release arm 66 which is nonrotatably secured to the shaft 58 and secured in position by a nut 67 on a threaded extension of the shaft 58. A bushing 68 is rotatably mounted on the shaft 58 between the frame angle 61 and the bracket 62. Rigidly secured to the bushing 68 is a clutch stop arm 69 which extends radially of the bushing 68 in opposite directions. The forwardly extending portion of the arm 69 mounts a clutch throwout roller 71, and a spring attaching stud 72 is mounted on the rearwardly extending portion of the clutch stop arm 69.

The mechanism shown in FIG. 10 has two purposes. One is to initiate the twine wrapping operation, and the other is to stop the feed to the bale rolling chamber after a bale of desired diameter has been formed. The twine wrapping phase of the operating cycle of the machine starts shortly before the last part of the material for the finished bale has been fed into the baling chamber. In order to accomplish this result, a clutch release link 73 is operatively interposed between the lower tension arm 22 and the rearwardly extending portion of the trip arm 57. A pin 74 (FIG. 10) extends laterally from the rear end of the trip arm 57, and the link 73 has an upper section which is pivotally connected with the pin 74. The link 73 has a lower section which is adjustable lengthwise of its upper section, and a jam nut 75 on the lower link section may be drawn up against the upper link section in order to lock the two link sections in a predetermined position of lengthwise adjustment relative to each other. The lower section of the link 73 has a pin and slot connection 76 with the lower tension arm 22 as shown in FIG. 4.

When the lower tension arm approaches the bale finishing position in which it is shown in FIG. 4, the play afforded by the pin and slot connection 76 is taken up and the trip arm 57 is rocked from the position in which it is shown in FIG. 1 to the position in which it is shown in FIG. 4. Such rocking movement of the trip arm 57 causes downward movement of the actuating rod 54 to an extent sufficient to pull the bell crank lever 51 out of supporting engagement with the twine tube 47. The twine tube 47 then drops to a lowered position and presents the free end of projecting twine to the material which moves into the baling chamber. shortly after the twine tube 47 has been dropped the feed of material into the bale forming chamber is stopped in response to a short anticlockwise rocking movement of the clutch stop arm 69 as will be explained more fully hereinbelow. The twine will therefore be entrained only by the last part of the material which moves into the baling chamber, and a subsequent sweep of the twine tube lengthwise of the bale will cause the twine to be wrapped spirally about the bale of final diameter.

At the end of the wrapping operation, the twine tube 47 is returned to its original raised position, and a short upward stroke is imparted to the actuating link 56 for the latch mechanism of the trip roll toggles 34 and 37. As a result of such upward stroke of the link 56, the baling chamber is opened by separation of the trip rolls 19 and 26 and the twine wrapped bale is ejected from the machine under the action of the tension spring 33. As soon as the baling chamber is opened the load which is imposed upon the lower tension arms 22 and 23 by the lower belts 16, and the load which is imposed upon the upper tension arms 28 and 29 by the upper belts 17 is relieved so that the lower tension arms are returned to their lower bale starting positions by the tension of the spring 33, and the upper tension arms 28 and 29 are likewise returned to their bale starting positions. As soon as the bale has been ejected the bow members 36 and 38 are also returned to their bale starting positions by the tension of springs 42 and 45, and the latch mechanism for the trip roll toggles is automatically reengaged by such return movement of the bow members 36 and 38.

The mentioned downward movement of the lower tension arm 22 upon ejection of the bale from the baling chamber returns the twine tube control linkage 51, 52, 53 and 54 to the position in which it is shown in FIG. 1 and in which the twine tube 47 is supported by the bell crank lever 51.

From the foregoing explanations it will be noted that the processing mechanism 2 has a predetermined operating cycle including a material admitting and a material shut off phase. The material supply mechanism 1 is continuously operable to gather material while the machine is being advanced in the field; to feed gathered material to the bale forming mechanism during the mentioned material admitting phase; and to return the gathered material from a rearward to a forward portion of the supply mechanism during the mentioned material shut off phase of the operating cycle. In order to accomplish these results the supply mechanism 1 is constructed as follows.

Referring to FIG. 1, a generally rigid supporting structure 77 of the material supply mechanism 1 is pivotally connected with the main frame 3 on the axis of the lower drive roll 13. A mechanism for raising and lowering the frame 77 about the axis of the lower drive roll 13 is of conventional construction and includes a lift rod 78 at the left side of the machine and a corresponding lift rod 79 at the right side of the machine.

A paddle type pickup conveyer 81 representing a gathering mechanism is operatively mounted on the forward part of the frame 77 and includes a forward sprocket shaft 82 and a rearward sprocket shaft 83. The conveyer 81 is driven continuously so as to pick up material at its forward or inlet end 81' and to move it rearwardly along the upper side of a rearwardly and upwardly inclined deck sheet of the supporting structure 77. The rear sprocket shaft 83 at the delivery end 81" of the pickup conveyer 81 is spaced a substantial forward distance from the bale forming mechanism of the machine. An auxiliary conveyer 84 is arranged, as shown in FIG. 1, in the space between the delivery end of the pickup conveyer 81 and the lower drive roll 13 of the bale forming mechanism. The auxiliary conveyer 84 represents an adjustable conveying mechanism between the gathering mechanism 81 and the baling mechanism for alternately delivering material to said baling mechanism and to a material delivering mechanism including a return conveyer 153 as more fully explained hereinbelow.

Figure 5:
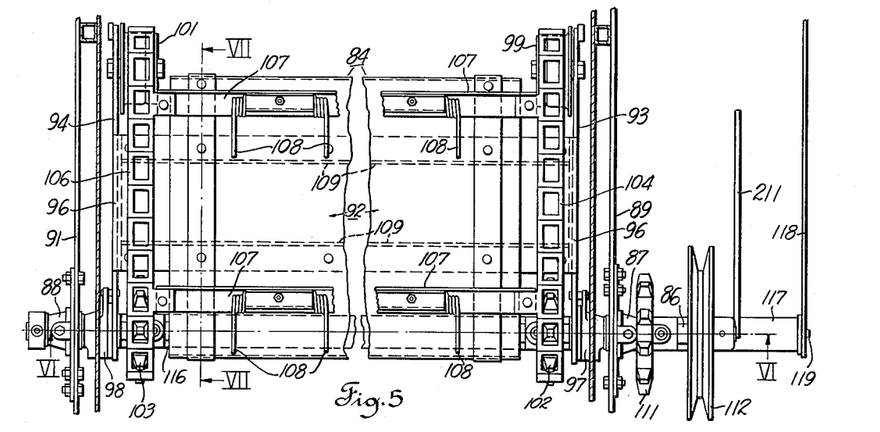
FIG. 5 is a section on line V—V of FIG. 1 showing right and left end portions of an auxiliary conveyor, an intermediate portion of the conveyor being broken away.
Figure 6:
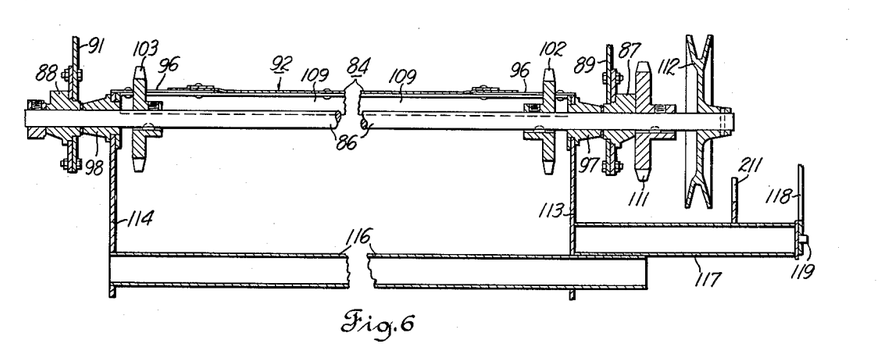
FIG. 6 is a section on line VI—VI of FIG. 5.
Figure 7:
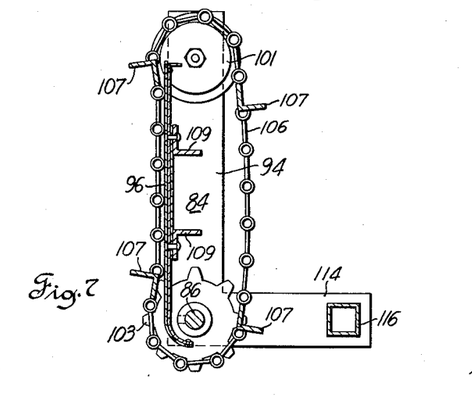
FIG. 7 is a section on line VII—VII of FIG. 5.

The auxiliary conveyer 84 is shown separately in FIGS. 5, 6 and 7 and is of special construction. As shown in FIG. 6, a shaft 86 which forms the forward drive shaft of the auxiliary conveyer 84 is rotatably mounted in bearings 87 and 88 which are rigidly secured to side walls 89 and 91 at left and right sides, respectively, of the supporting structure 77. Swingably mounted on the shaft 86 in the space between the side walls 89 and 91 is a frame 92 comprising side members 93 and 94 (FIG. 5) and an apron 96 (FIG. 7) rigidly connected with the side members 93 and 94 and extending rearwardly from and in slightly elevated relation to the shaft 86. Mounted in forward portions of the side members 93 and 94 are bearings 97 and 98, respectively, by means of which the frame 92 is pivotally mounted on the shaft 86 for swinging movement about the axis of the latter. Rollers 99 and 101 are rotatably mounted at the rear ends of the side members 93 and 94, respectively, and sprocket wheels 102 and 103 are fixedly secured to the shaft 86 in line with the rollers 99 and 101, respectively.

A conveyer chain 104 is trained about the sprocket wheel 102 and roller 99, and a similar conveyer chain 106 is trained about the sprocket wheel 103 and the roller 101. A series of cross slats 107 are secured at their opposite ends to the chains 104 and 106, respectively, and mount spring fingers 108. The assembly of chains, cross members and spring fingers provides an endless conveying element of the auxiliary conveyer whose upper stretch is supported on the apron 96. Reinforcing angles 109 are secured to the underside of the apron 96 and the forward end of the latter is curved downwardly about the shaft 86, as shown in FIG. 7.

In addition to the sprocket wheels 102 and 103, a driving sprocket 111 and a belt pulley 112 are fixedly secured to the shaft 86 as shown in FIGS. 5 and 6. Also secured to the side members 93 and 94 of the auxiliary conveyer frame are depending arms 113 and 114, respectively, which are cross connected at their free ends by a tubular transverse brace 116. As shown in FIG. 6, the brace 116 projects outwardly beyond the arm 113 and a side arm 117 of square tubing is welded to the outwardly extending end portion of the brace 116. The arm 117 extends outwardly from the arm 113 in parallel relation to the shaft 86 and beyond the belt pulley 112. The entire frame 92 of the auxiliary conveyer together with the associated endless conveying element 104, 106, 107 may be rocked about the axis of the shaft 86 by back and forth movement of an actuating link 118 (FIG. 1) which is pivotally connected to a stud 119 (FIG. 6) at the outer end of the side arm 117.

In the condition of the machine as shown in FIG. 1, the auxiliary conveyer 84 is shown in a position generally in line with the pickup conveyer 81 and, in operation, the conveying element of the auxiliary conveyer 84 is driven in the same direction as the conveying element of the pickup conveyer 81. Material which is picked up by the conveyer 81 and delivered to the receiving end 84' of the auxiliary conveyer 84 will therefore be advanced rearwardly toward the bale forming mechanism as long as the discharge end 84" of the auxiliary conveyer 84 is in the downwardly adjusted position in which it is shown in FIG. 1. At the end of the bale forming operation the auxiliary conveyer 84 is tilted upwardly from the position in which it is shown in FIG. 1 to the position in which it is shown in FIG. 4, so as to serve as a material elevating means. Such upward tilting of the auxiliary conveyer 84 is accomplished by means of an actuating mechanism including a partial revolution clutch 122.

Figure 8:
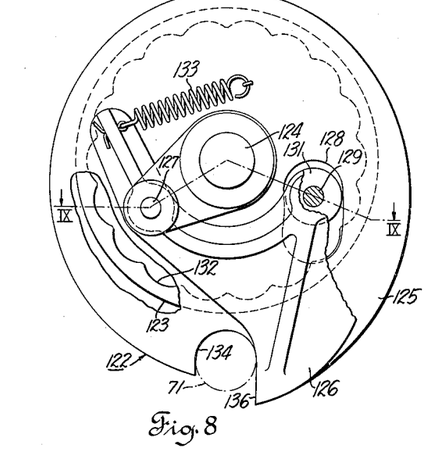
FIG. 8 is a detail view of a partial revolution clutch shown in FIGS. 1 and 4.
Figure 9:
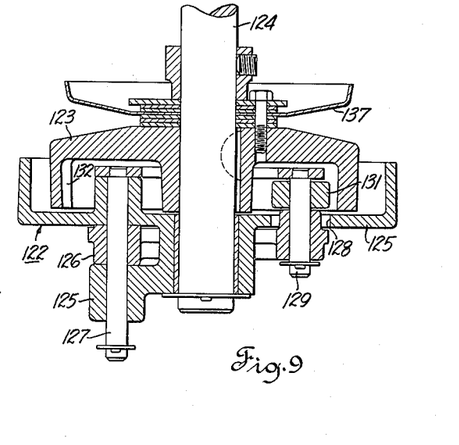
FIG. 9 is a section on line IX—IX of FIG. 8.

The clutch 122 is of conventional construction and it is shown in detail FIGS. 8 and 9. The driving member 123 of the clutch is fixedly secured to the continuously rotating shaft 124 of the lower drive roll 13. The driven member 125 is journaled on the outer end of the shaft 124, and a rocker 126 is pivotally mounted on the driven member 125 by means of a pivot pin 127. An arcuate slot 128 in the driven clutch member 125 provides an aperture through which a pin 129 extends into the interior space of the clutch. The pin 129 mounts a roller 131 which is movable into and out of cooperative engagement with a scalloped inner surface 132 of the driving clutch member 123 by pivotal movement of the rocker 126 about the pin 127. A coil spring 133 which is connected with the rocker 126 and with the driven clutch member 125 biases the rocker 126 toward its clutch engaged position in which the roller 131 is seated in one of the cavities of the scalloped surface 132. The driven clutch member 125 has a radial notch 134 which in the position of the parts as shown in FIGS. 1 and 8 accommodates the roller 71 of the control mechanism shown in FIG. 10. In the condition of the clutch, as shown in FIGS. 1 and 8, the roller 131 is kept out of engagement with the scalloped surface 132 by contact of stop surface 136 of the rocker 126 with the roller 71.

The actuating link 118 for the auxiliary conveyer which, as stated, is pivotally connected at its forward end with the side arm 117 of the auxiliary conveyer frame 92, is pivotally connected at its rear end with the driven member 125 of the clutch 122 by means of the pin 127. The driving member 123 of the clutch, as shown in FIG. 9, has a conical rear surface which in conjunction with a conical disk 137 forms a driving sheave for the belt 49 (FIG. 1) which drives the cycling mechanism of the baler.

When the lower tension arm 22 approaches its bale finishing position in which it is shown in FIG. 4, the link 73 pushes upward on the pin 74 (FIG. 10) of the trip arm 57. Such push on the trip arm 57 causes a pin 138 on the clutch release arm 66 to engage the lower edge of the clutch stop arm 69 and, as a result, the roller 71 will be forced out of the notch 134 of the driven clutch member 125. Such outward movement of the roller 71 continues until it clears the stop surface 136 of the rocker 126. As soon as the roller 71 clears the stop surface 136, the spring 133 pivots the rocker 126 on the pin 127 and thereby engages the roller 131 with one of the cavities of the scalloped surface 132. The driven member 125 is now locked to the driving member 123 and the entire clutch assembly will begin to rotate in clockwise direction as viewed in FIG. 1. Such rotation of the clutch assembly will continue for about one-half revolution, and the clutch is then automatically disengaged by coaction of the stop surface 136 of the rocker 126 with another roller 139 (FIG. 4) which is rotatably mounted on an upper clutch stop arm 141. The arm 141 is pivoted on the main frame 3 at 142, and a tension spring 143 is operatively interposed between the lower and upper clutch stop arms 69 and 141 so as to bias the arm 141 downward and the arm 69 upward. The spring 143 is hooked at its lower end over a pin 144 (FIG. 10) on the lower clutch stop arm 69 and the upper end of the spring 143 is hooked in to a strap 146 which has a pivot connection at 147 with the upper clutch stop arm 141. Another coil spring 148 (FIG. 4) is hooked to the pin 72 (FIG. 10) of the lower clutch stop arm 69 and is anchored at its other end on the main frame, the purpose of the spring 148 being to bias the lower clutch stop arm 69 clockwise, as viewed in FIG. 4, about the rock shaft 58.

Also pivoted to the upper clutch stop arm 141 at 147 is an actuating rod 149 which extends upwardly toward a bail 151 which is pivotally mounted on the main frame 3 at 152 and forms part of the conventional control mechanism for the baler. The upper end of the rod 149 has a spring cushioned actuating connection with the bail 151 so that it may be given a short upward stroke when the bow members 36 and 38 hit the bail 151 upon their return movement to normal position after the bale has been ejected.

In the position of the parts as shown in FIG. 4, the roller 139 of the upper clutch stop arm is seated in the notch 134 of the driven clutch member, and the rocker 126 is kept in clutch disengaged position by coaction of the stop surface 136 with the roller 139. When the actuating rod 149 is pulled upward after a bale has been ejected, such upward pull of the rod 149 lifts the roller 139 from the position in which it is shown in FIG. 4 so that the clutch becomes engaged and the whole clutch assembly starts to rotate in clockwise direction as viewed in FIG. 4.

As soon as the bale has been ejected, the lower tension arm 22 moves rapidly downward from the bale finishing position in which it is shown in FIG. 4 to a bale starting position (not shown). Such downward movement of the lower tension arm 22 is followed by downward movement of the push link 73 and consequent clockwise movement of the lower clutch stop arm 69 about the rock shaft 58 under the tension of the spring 148. As a result, the lower clutch stop arm 69 and its associated roller 71 will be moved from the position in which they are shown in FIG. 4 against the periphery of the driven clutch member 125 immediately upon ejection of the bale and at about the same time as the upper clutch stop arm 141 and its associated roller 139 are lifted from the position in which they are shown in FIG. 4. Rotation of the driven clutch member 125 from the position in which it is shown in FIG. 4 stops when the stop surface 136 of the rocker 126 engages the roller 71 and the roller is forced into the notch 134 by the tension of springs 143 and 148. This establishes the condition of the clutch in which it is shown in FIG. 1.

From the foregoing explanations it will be noted that upon formation of a bale of predetermined diameter, the driven member 125 of the clutch 122 is rotatable by a first partial revolution from the position in which it is shown in FIG. 1 and which may be termed a first position, to the position in which the driven clutch member 125 is shown in FIG. 4 and which may be termed a second position. A second partial revolution of the driven clutch member from its second to its first position is automatically effected by operation of the cycling mechanism of the baler upon ejection of a twine wrapped bale from the machine.

When the driven clutch member 125 moves from its mentioned first position (FIG. 1) to its mentioned second position (FIG. 4) in the hereinbefore described manner, upon formation of a bale of desired diameter, the link 118 moves rearwardly from the position in which it is shown in FIG. 1 and, as a result, the auxiliary conveyer 84 is tilted from its lowered position (FIG. 1) to its upwardly inclined position (FIG. 4) by said first partial-revolution of the driven clutch member 125. Similarly, when the driven clutch member 125 moves from its second position (FIG. 4) to its first position (FIG. 1) in the hereinbefore mentioned manner, upon ejection of the bale from the machine the link 118 moves forwardly from the position in which it is shown in FIG. 4 and, as a result, the auxiliary conveyor 84 is tilted from its raised position (FIG. 4) to its lowered position (FIG. 1) by said second partial revolution of the driven clutch member 125.

Referring to FIG. 1, the supply mechanism 1 includes in addition to the pickup conveyor 81 and auxiliary conveyer 84, a return conveyer 153; a feeder beater 154, and an auxiliary beater 156. The return conveyer 153, feeder beater 154 and auxiliary beater 156 represent a material delivering mechanism adjacent the gathering mechanism 81 for delivering material selectively from the discharge end to the intake end of the gathering mechanism.

The return conveyer 153 comprises a trough 157 which is pivotally supported at its rear end on a shaft 158. The shaft 158 is rotatably mounted in upwardly extending side members of the supporting structure 77 for the conveyers 81 and 84. A midportion of the trough 157 of the return conveyer 153 is sustained by a pair of rearwardly and upwardly extending brace rods 159, only one being shown in FIG. 1. The brace rods 159 have rearward connections (not shown) with the main frame 3 and their forward ends are secured to opposite sides of the trough 157. At the forward end of the conveyer trough 157 transversely spaced rollers 166 and 167 are rotatably mounted on an axis extending parallel to the shaft 158. An endless conveying element 162 of the return conveyer is trained about the rollers 166 and 167 and about drive sprockets 163 and 164 (FIG. 2) on the shaft 158. Cross members of the endless conveying element 162 are conventionally equipped with spring tines 168. Similar spring tines 169 are mounted on cross members of the pickup conveyer 81. The upper run of the conveying element 162 is supported on a bottom wall 161 of the trough 157.

The feeder beater 154 comprises a shaft 171 which is rotatably mounted at its opposite ends in opposite side walls of the supporting structure 77 for the pickup and auxiliary conveyers. Three beater paddles 172 extend radially at equal circumferential spacings from the shaft 171 within the space between the side walls of the supporting structure 77.

The auxiliary beater 156 comprises a shaft 173 which like the shaft 171 is rotatably mounted at its opposite ends in opposite side walls of the supporting structure 77. Like the feeder beater 154, the auxiliary beater 156 has three equally spaced beater paddles 174.

Figure 2:
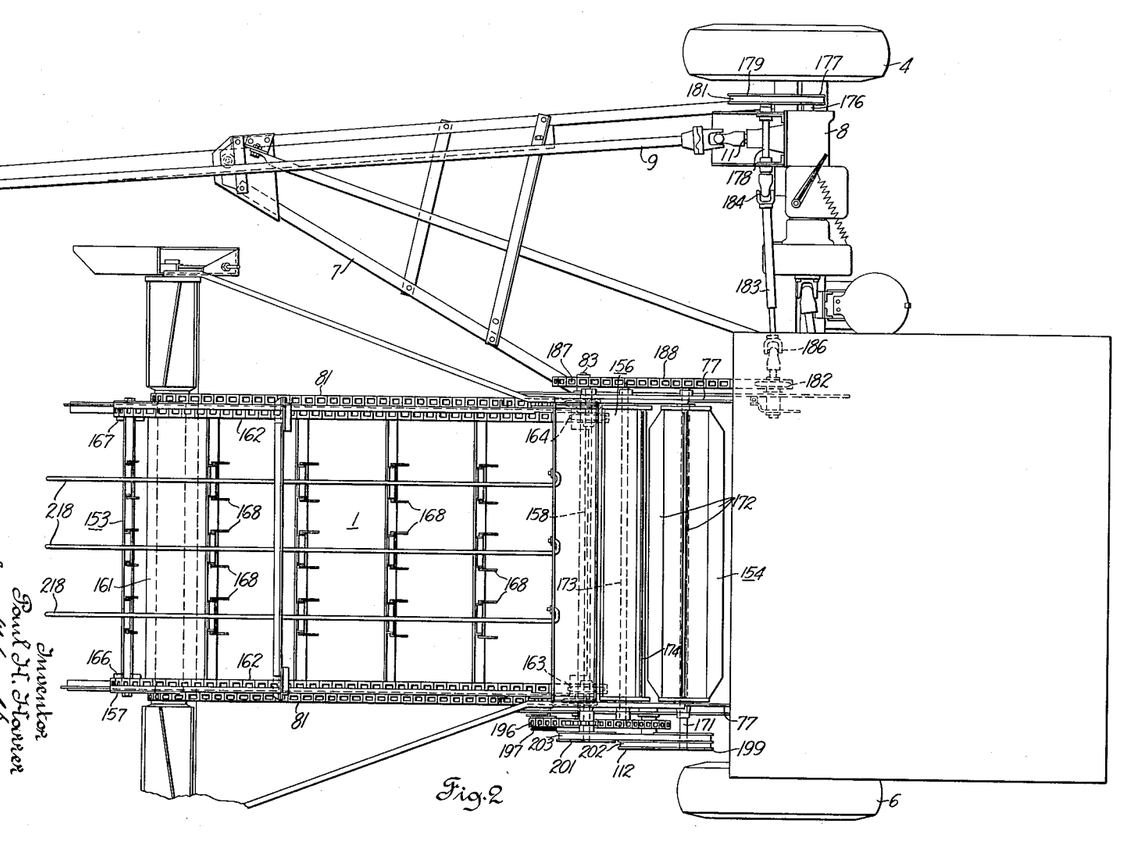
FIG. 2 is a top view of the machine shown in FIG. 1, the forward ends of a draft tongue and power line and the left forward corner of a pickup mechanism being broken away.

Power for driving the pickup conveyer 81, the auxiliary conveyer 84, the return conveyer 153, the feeder beater 154 and the auxiliary beater 156 is derived from the gear mechanism 8 (FIG. 2). Referring to FIGS. 2 and 3, a continuously rotating power outlet shaft 176 extends horizontally from the right end of the gear mechanism 8 and mounts a belt sheave 177. A counter shaft 178 at the forward side of the gear mechanism 8 mounts a complementary belt sheave 179 and is driven from the sheave 177 by means of a belt 181. A tensioning idler 180 for the belt 181 is rotatably mounted on a spring loaded supporting arm, not shown.

The counter shaft 178 drives a sprocket wheel 182 at the right side of the conveyer supporting structure 77 by means of telescopic shaft 183 and universal joints 184 and 186. The sprocket wheel 182, as shown in FIG. 3, drives a sprocket wheel 187 by means of a chin 188. The sprocket wheel 187 is fixedly secured to the right end of the shaft 83 which projects outwardly from the right side of the conveyer supporting structure 77. The left end of the shaft 83 which extends outwardly from the left side of the conveyer supporting structure 77 mounts a sprocket wheel 192 in the same vertical plane as the sprocket wheel 111 on the auxiliary conveyer drive shaft 86. Additional sprocket wheels 193 and 194 are fixedly secured, respectively, to the drive shaft 158 of the return conveyer 153 and to the auxiliary beater shaft 173, at the left side of the supporting structure 77. An endless chain 196 connects the sprockets 111, 192, 193 and 194 in power transmitting relation with each other, and a tensioning idler 197 for the chain 196 is adjustably mounted on the supporting structure 77 forwardly of the sprocket wheel 193.

The shaft 83 is continuously driven in clockwise direction as indicated by arrow 198 in FIG. 4 and consequently the auxiliary conveyer drive shaft 86 is also driven in clockwise direction as viewed in FIG. 4. From the sprocket 111 the chain 196 passes over the sprocket 194, under the sprocket 193 and over the idler 197 back to the sprocket 192. The auxiliary beater drive sprocket 194 will therefore be rotated in clockwise direction and the return conveyer drive sprocket 193 will be rotated in anticlockwise direction while the pickup and auxiliary conveyer drive sprockets 192 and 111 are rotated in clockwise direction. Clockwise rotation of the sprocket 192 in the described manner causes the upper stretch of the pickup conveyer to move rearwardly. At the same time anticlockwise rotation of the sprocket 193 causes the upper stretch of the endless conveying element 162 of the return conveyer to move forwardly.

The feeder beater 154 is selectively rotatable in opposite directions by means of a reversible drive mechanism which is generally designated in FIG. 1 by the reference character 200 and constructed as follows. Referring to FIGS. 2 and 4, a double groove belt sheave 199 is secured to the end of the feeder beater shaft 171 at the left side of the supporting structure 77, and a single groove belt sheave 201 is secured to the return conveyer shaft 158 at the left side of the supporting structure 77. An endless V-belt 202 is placed around the sheaves 112 and 199 so as to ride in the V-groove, the sheave 112 and in the axially outer V-groove of the sheave 199. Another endless V-belt 203 is placed around the sheaves 201 and 199 so as to ride in the V-groove of the sheave 201 and in the axially inner V-groove of the sheave 199. The length of the belt 202 is appreciably greater than that of a normally tensioned power transmitting belt between the sheaves 112 and 199 whose length would be conventionally determined by the center spacing of these sheaves and the pitch diameters of their belt engaging V-grooves. Similarly, the length of the belt 203 is appreciably greater than that of a normally tensioned power transmitting belt between the sheaves 201 and 199 whose length would be conventionally determined by the center spacing of these sheaves and the pitch diameters of their belt engaging V-grooves.

In the condition of the mechanism as shown in FIG. 4 the slack of the belt 202 is taken up by a tensioning idler 204 which is rotatably mounted on the free end of the swingable arm 206. The arm 206 is pivoted at 207 on the supporting structure 77 and is actuated by a thrust link 208. The lower end of the thrust link 208 is pivotally connected at 209 to the free end of an actuating arm 211 which is rigidly secured, as by welding, to the side arm 117 (FIG. 6) of the auxiliary conveyor frame 92. As shown in FIG. 4, the actuating arm 211 extends transversely of the side arm 117 at a fixed angle which remains unchanged when the auxiliary conveyor is swung from the raised position in which it is shown in FIG. 4, to the lowered position in which it is shown in FIG. 1. The thrust link 208 has a rod portion 212 which extends through a side lug 213 of the idler supporting arm 206. The rod portion 212 is slidable lengthwise within the side lug 213, and buffer springs 214 and 216 are placed around the rod 212 below and above the lug 213.

In the condition of the mechanism, as shown in FIG. 4, the buffer spring 214 is compressed and the belt 202 is thereby placed under sufficient tension to effectively transmit power from the sheave 112 to the sheave 199. A complementary idler 217 is mounted on the supporting structure 77 at a fixed location for cooperation with the belt 202 in the tensioned condition of the latter.

Transmission of power from the sheave 112 to the sheave 199 through the belt 202 in the hereinbefore described manner causes the feeder beater 154 to rotate in clockwise direction as viewed in FIG. 4. The rotation of the feeder beater 154 is automatically reversed when the auxiliary conveyor 84 is moved from its raised to its lowered position by operation of the partial revolution clutch 122. Lowering movement of the auxiliary conveyor 84 causes downward swinging movement of the pivot connection 209 between the actuating arm 211 and the thrust link 208 and consequent downward movement of the thrust link 208 to the position in which it is shown in FIG. 1. As a result of the downward movement of the thrust link 208, the idler supporting arm 206 is moved to a downwardly adjusted position in which the tensioning idler 204 is out of cooperative engagement with the belt 202 and in cooperative engagement with the lower stretch of the belt 203. The buffer spring 216 above the side lug 213 is compressed in the condition of the parts as illustrated by FIG. 1, and as a result, the belt 203 is properly tensioned to transmit power from the sheave 201 to the sheave 199. As explained hereinbefore, the direction in which the sheave 201 rotates is opposite to the direction in which the sheave 112 rotates, and the feeder beater 154 will therefore be rotated in anticlockwise direction in the condition of the mechanism, as shown in FIG. 1.

When the machine is operated in the field while the driven member 125 of the partial revolution clutch is in its first position, as shown in FIG. 1, hay enters the supply mechanism 1 at the forward end of the pickup conveyor 81 and it is passed from the delivery end of the latter to the auxiliary conveyor 84. The feeder beater rotates in anticlockwise direction, and as a result of the combined action of the auxiliary conveyor and the feeder beater, hay is passed to the feed roll 44 and from the latter into the bale forming chamber between the upper and lower belts 16 and 17. The feed of material into the baling chamber continues for the duration of the bale forming operation. At the end of the bale forming operation the partial revolution clutch 122 is automatically engaged by operation of its trip mechanism which includes the clutch stop arm 69 and trip roller 71, with the result that the auxiliary conveyor 84 is moved to its raised position and the anticlockwise rotation of the feeder beater 154 is changed to clockwise rotation. The supply mechanism 1 now operates to circulate the picked up hay in an endless path exteriorly of the bale rolling belts and thereby forms it into an extended mat of progressively increasing thickness on the upper run of the pickup conveyor 81. This result is obtained by delivery of hay from the pickup conveyor 81 to the raised auxiliary conveyor 84 and by the impelling action of the feeder beater 154 which in conjunction with the impelling action of the auxiliary beater 156 causes passage of hay to the rear of inlet end 153' of the upper or return conveyor 153. The upper run of the return conveyor 153 feeds the material forwardly and drops it from its forward or outlet end 153'' upon the inlet end of the pickup conveyor 81. A series of deflecting rods 218 are loosely suspended within the trough 157 above the return conveyor 153 and the forward ends of the deflecting rods 218 are curved downward in front of the return conveyor so as to assist passage of material from the upper return conveyor to the lower pickup conveyor.

The condition of the supply mechanism 1 in which the incoming material is returned from the delivery end of the pickup conveyor to the inlet end of the pickup conveyor is maintained for the duration of the material shut off phase of the baling mechanism. This shut off phase includes the twine wrapping phase and the bale ejecting phase which are automatically controlled by the cycling mechanism of the baler in conventional manner and as has been explained hereinbefore.

The auxiliary conveyor 84 and the beaters 154 and 156 constitute material transfer means which are adjustable selectively to either a first operating condition as shown in FIG. 1 for passing material from the delivery end of the lower conveyor 81 to the bale forming mechanism, or to a second operating condition as shown in FIG. 4 for passing material from the delivery end of the lower conveyor 81 to the inlet end of the upper conveyor 153. Control means which are operable to adjust the transfer means to either said first or second operating condition include the partial revolution clutch 122 and the thrust link 208 for actuating the reversible drive of the feeder beater 154. The control means for the material transfer mechanism is operatively connected with the bale forming mechanism by the actuating rods 54 and 56 and associated parts so that the transfer means will be in their first operating condition (FIG. 1) during the material admitting phase of the operating cycle of the baler and so that the material transfer means will be in their second operating condition (FIG. 4) during the material shut off phase of the baler operating cycle.

Depending on the duration of the wrapping phase of the operating cycle the amount of material which is being circulated by the supply mechanism will be larger or smaller. Provisions may be made to perform the wrapping operation within a relatively short time as by the use of a two speed transmission for driving the lower and upper drive rolls 13 and 14 and the actuating mechanism of the twine guide tube 47. A two speed transmission and its connection with the baler so as to reduce the duration of the twine wrapping phase of the operating cycle is disclosed in U.S. Patent 2,826,985, issued March 18, 1958 to P. H. Harrer for Rotary Baler.

If the wrapping phase of the operating cycle is relatively short, an extended mat of double thickness may be formed on the lower conveyor 81 during the material shut off phase of the operating cycle and while the machine is being propelled continuously in the field. When the auxiliary conveyor is placed into its lowered position after the mat of double thickness has been formed on the lower conveyor such mat will be passed to the bale forming mechanism by the combined action of the auxiliary conveyor 84 and feeder beater 154. Movement of the double thickness mat or of a mat of even greater thickness involving three or more layers toward the baling mechanism will be assisted by the lower run of the upper conveyor 153 which continuously moves rearward during the operation of the machine.

While in the foregoing a preferred embodiment of the invention has been explained, it should be understood that it is not intended to limit the invention to the exact forms and details herein described, and that the invention includes such other forms and modifications as are embraced by the scope of the appended claims.

What is claimed is:

1. A baling machine comprising, in combination, a continuously operable feed mechanism having a material inlet and a material outlet end; a bale forming mechanism having a predetermined operating cycle including a material admitting and a material shut off phase; conveying means adjustable selectively to either a first operating condition for delivering material from said outlet end of said feed mechanism to said bale forming mechanism, or to a second operating condition for delivering material from said outlet to said inlet end of said feed mechanism; control means operable to adjust said conveying means to either said first or to said second operating condition; and means operatively connecting said control means with said bale forming mechanism for actuation thereby so that said conveying means will be in said first operating condition during said material admitting phase and in said second operating condition during said material shut off phase of said operating cycle.

2. A baling machine comprising, in combination, a rearwardly feeding lower conveyer; a forwardly feeding upper conveyer having an outlet end in materail delivering relation to the inlet end of said lower conveyer; a bale forming mechanism having a predetermined operating cycle including a material admitting and a material shut off phase; material transfer means adjustable selectively to either a first operating condition for passing material from the delivery end of said lower conveyer to said bale forming mechanism, or to a second operating condition for passing material from said delivery end of said lower conveyer to the inlet end of said upper conveyer; control means operable to adjust said transfer means to either said first or said second operating condition; and means operatively connecting said control means with said bale forming mechanism for actuation thereby so that said transfer means will be in said first operating condition during said material admitting phase, and in said second operating condition during said material shut off phase of said operating cycle.

3. A baling machine comprising, in combination, a rearwardly feeding lower conveyer; a forwardly feeding upper conveyer having an outlet end in material delivering relation to the inlet end of said lower conveyer; a bale forming mechanism having a predetermined operating cycle including a material admitting and a material shut off phase; material elevating means having a receiving end adjacent the delivery end of said lower conveyer and having a discharge end selectively adjustable to a lowered position adjacent said bale forming mechanism and to a raised position adjacent the inlet end of said upper conveyer; control means operable to adjust said discharge end of said elevating means to said lowered and raised positions; and means operatively connecting said control means with said bale forming mechanism for actuation thereby so as to place said discharge end of said elevating means into said lowered position during said material admitting phase and into said raised position during said material shut off phase.

4. A baling machine comprising, in combination, a rearwardly feeding lower conveyer; a forwardly feeding upper conveyer having an outlet end in material delivering relation to the inlet end of said lower conveyer; a bale forming mechanism having a predetermined operating cycle including a material admitting and a material shut off phase; rotary material impelling means operatively disposed relative to said lower conveyer, upper conveyer and bale forming means so that material moved rearwardly by said lower conveyer will be directed alternately toward said bale forming mechanism and toward said inlet end of said upper conveyer by rotation of said impelling means in one direction or the other, respectively; a reversible drive mechanism for said impelling means; control means for said drive mechanism; and means operatively connecting said control means with said bale forming mechanism for actuation thereby so that said impelling means will be driven in said one direction during said material admitting phase, and in said other direction during said material shut off phase.

5. A baling machine comprising, in combination, a rearwardly feeding lower conveyer; a forwardly feeding upper conveyer having an outlet end in material delivering relation to the inlet end of said lower conveyer; a bale forming mechanism having a predetermined operating cycle including a material admitting and a material shut off phase; rotary material impelling means mounted forwardly of said bale forming mechanism adjacent the inlet end of said upper conveyer; material elevating means having a receiving end adjacent the delivery end of said lower conveyer and having a discharge end selectively adjustable to a lowered position adjacent said bale forming mechanism and to a raised position adjacent said impelling means; a reversible drive mechanism for said impelling means; actuating means operatively connected with said elevating means for selectively adjusting said discharge end thereof to said lowered and raised positions; and control means for said drive and actuating means operatively connected with said bale forming mechanism for actuation thereby so that said impelling means will be rotated in one direction and said discharge end of said elevating means will be in said lowered position during said admitting phase, and so that said impelling means will be rotated in the other direction and said discharge end of said elevating means will be in said raised position during said shut off phase.

6. A baling machine comprising, in combination, a rearwardly feeding lower conveyer, an auxiliary conveyer swingably mounted at the delivery end of said lower conveyer for selective adjustment to either a lowered position generally in line with said lower conveyer or to a raised position in upwardly inclined relation to said lower conveyer; a forwardly feeding upper conveyer adapted to receive material at its inlet end from said raised auxiliary conveyer and having a discharge end in material delivering relation to the inlet end of said lower conveyer; a bale forming mechanism adapted to receive material from said lowered auxiliary conveyer and having a predetermined operating cycle including a material admitting and a material shut off phase; actuating means operatively connected with said auxiliary conveyer for moving the latter to said lowered and raised positions; and control means for said actuating means operatively connected with said bale forming mechanism so that said auxiliary conveyer will occupy said lowered position during said material admitting phase, and said raised position during said material shut off phase of said operating cycle.

7. A baling machine comprising, in combination, a rearwardly feeding lower conveyer, an auxiliary conveyer swingably mounted at the delivery end of said lower conveyer for selective adjustment to either a lowered position generally in line with said lower conveyer or to a raised position in upwardly inclined relation to said lower conveyer; a forwardly feeding upper conveyer adapted to receive material at its inlet end from said raised auxiliary conveyer and having an outlet end in material delivering relation to the inlet end of said lower conveyer; a bale forming mechanism adapted to receive material from said lowered auxiliary conveyer and having a predetermined operating cycle including a material admitting and a material shut off phase; a feeder beater rotatably mounted rearwardly of said upper conveyer and forwardly of said bale forming mechanism in such relation to said auxiliary conveyer as to assist movement of material from said lowered auxiliary conveyer to said bale forming mechanism by rotation of said feeder beater in one direction, and so as to assist movement of material from said raised auxiliary conveyer to said upper conveyer by rotation of said feeder beater in the opposite direction; power transmitting means operable to continuously drive said lower, said auxiliary, and said upper conveyers and including a reversible drive mechanism for rotating said feeder beater alternately in opposite directions; actuating means operatively connected with said auxiliary conveyer for moving the latter to said lowered and raised positions; and control means for said reversing mechanism and actuating means operatively connected with said bale forming mechanism so that said feeder beater will be rotated in said one direction and said auxiliary conveyer will be in said lowered position during said material admitting phase, and so that said feeder beater will be rotated in said opposite direction and said auxiliary conveyer will be in said raised position during said shut off phase of said operating cycle.

8. A baling machine as set forth in claim 7 and further comprising an auxiliary beater rotatably mounted at the side of said feeder beater next to said upper conveyer and in elevated relation to the latter; and power transmitting means operatively connected with said auxiliary beater for driving the latter in a direction so as to assist passage of material from said feeder beater to said upper conveyer.

9. A baling machine comprising, in combination, a continuously operable feed conveyer having a material inlet and a material delivery end; a bale forming mechanism having a predetermined operating cycle including a material admitting and a material shut off phase; conveying means adjustable selectively to either a first operating condition for delivering material from said delivery end of said feed conveyer to said bale forming mechanism, or to a second operating condition for returning material from said delivery to said inlet end of said feed conveyer; a partial revolution clutch having a continuously rotatable driving element, an intermittently rotatable driven element, and trip means operatively connected with said bale forming mechanism for actuation thereby so as to cause a first partial revolution of said driven clutch element at the end of said material admitting phase and a second partial revolution of said driven element at the end of said material shut off phase; and means operatively connecting said driven clutch element with said conveying means for adjusting the latter from said first to said second operating condition by said first partial revolution of said driven clutch element, and for adjusting said conveying means from said second to said first operating condition by said second partial revolution of said driven clutch element.

10. A baling machine as set forth in claim 9 comprising an auxiliary conveyer forming part of said conveying means and having a frame; pivot means operatively mounting said frame at one end thereof adjacent said delivery end of said feed conveyer; power transmitting means operatively connecting said frame with said driven element of said partial revolution clutch so as to swing said frame from a lowered to a raised position by said first partial revolution and so as to swing said frame from said raised to said lowered position by said second partial revolution of said driven clutch element; and means including a conveying element operatively mounted on said frame for passing material from said delivery end of said feed conveyer toward said bale forming mechanism while said frame is in said lowered position, and for passing material from said delivery end to said inlet end of said feed conveyer while said frame is in said raised position.

11. A baling machine as set forth in claim 9 comprising a rotary beater element forming part of said conveying means and selectively operable in one direction to assist movement of material from said feed conveyer toward said bale forming mechanism, or in the opposite direction to assist movement of material from said delivery to said inlet end of said feed conveyer; a reversible drive mechanism for said beater element; and a control element for said drive mechanism operatively connected with said driven element of said partial revolution clutch so that rotation of said beater element will be changed from said one to said opposite direction in response to said first partial rotation of said driven clutch element, and so that rotation of said beater element will be changed from said opposite to said one direction by said second partial rotation of said driven clutch element.

12. A material supply mechanism for baling machines and the like comprising, in combination, a support; a feed conveyer mounted on said support and having forward material inlet and rearward material delivery ends, respectively; a return conveyer mounted on said support and having a rearward inlet and a forward outlet end in material delivering relative to said inlet end of said feed conveyer; and material transfer means mounted on said support and selectively operable to direct material from said discharge end of said feed conveyer toward or away from said inlet end of said return conveyer, said material transfer means comprising an auxiliary conveyer tiltably mounted at one end thereof on said support for swinging movement on an axis in proximity to the material delivery and of said feed conveyer; means operable to drive said auxiliary conveyer in one direction for advancing material from said one end of said auxiliary conveyer to the other; and adjusting means operatively connected with said auxiliary conveyer for swinging the latter about said axis selectively in opposite directions between a lowered material diverting position substantially in line with said feed conveyer and an upwardly tilted position in material delivering relation to said inlet end of said return conveyer.

13. A material supply mechanism as set forth in claim 12 and further comprising a reversible rotatable feeder beater operatively mounted on said support rearwardly of said return conveyer for directing material delivered by said feed conveyer either toward or away from said inlet end of said return conveyer.

14. A pick-up baler comprising a gathering mechanism, a baling mechanism operatively associated therewith, a material delivering mechanism adjacent said gathering mechanism for delivering material selectively from the discharge end to the intake end of said gathering mechanism, and adjustable conveying mechanism between said gathering mechanism and said baling mechanism for alternatively delivering material to said baling mechanism and to said material delivering mechanism.

15. A pick-up baler as set forth in claim 14 wherein said baling mechanism comprises belt means adapted to receive material from said adjustable conveying mechanism and to roll said material into a cylindrical bale.

16. A pick-up baler as set forth in claim 14 wherein said baling mechanism comprises belt means adapted to receive material from said adjustable conveying mechanism and to roll said material into a cylindrical bale, and twine dispensing means for wrapping said bale with twine.

References Cited in the file of this patent

UNITED STATES PATENTS

| | | |
|---|---|---|
| 229,703 | Hillard | July 6, 1880 |
| 1,609,829 | Peloquin | Dec. 7, 1926 |
| 2,246,361 | Johnson | June 17, 1941 |
| 2,581,542 | Kolzing | Jan. 8, 1952 |
| 2,667,729 | Harrer | Feb. 2, 1954 |
| 2,675,118 | Morrison | Apr. 13, 1954 |
| 2,692,124 | Mendoza | Oct. 19, 1954 |
| 2,830,693 | Schlossmacher | Apr. 15, 1958 |